June 24, 1969  H. H. TAKETA  3,451,488
REFUSE RETRIEVING DEVICE
Filed March 29, 1967
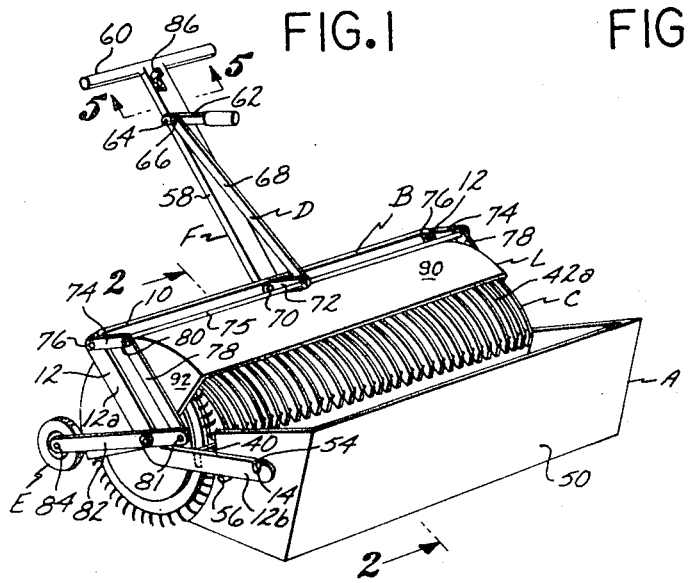
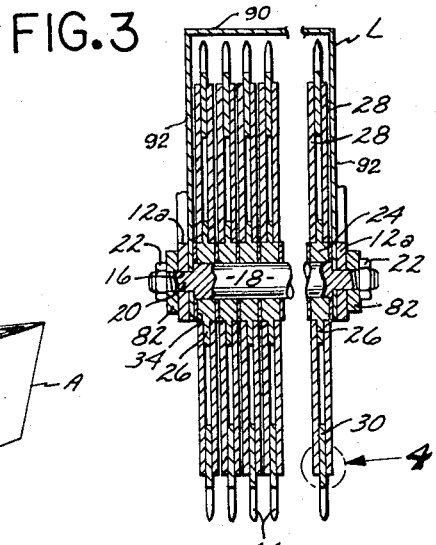
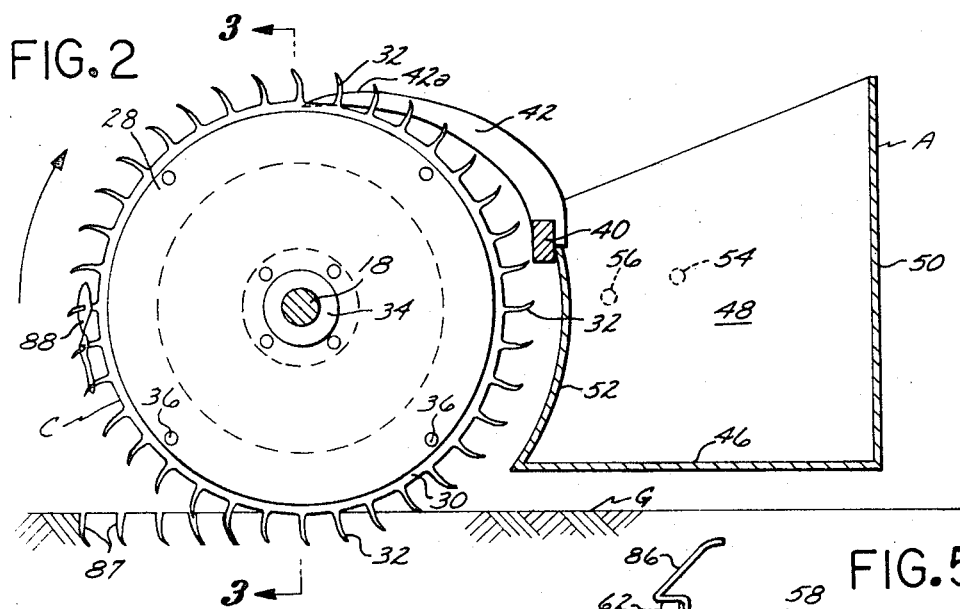
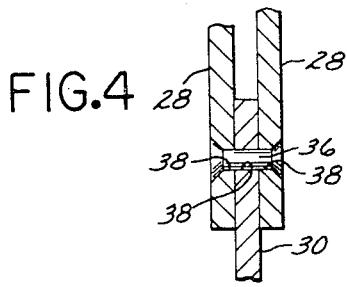
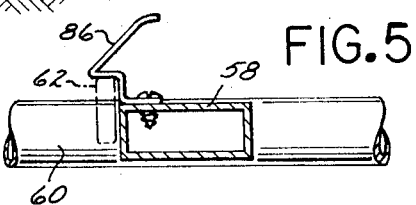
INVENTOR.
HOWARD H. TAKETA
BY
William G. Babcock
ATTORNEY

United States Patent Office 3,451,488
Patented June 24, 1969

3,451,488
REFUSE RETRIEVING DEVICE
Howard H. Taketa, 840 S. Lincoln,
Monterey Park, Calif. 91754
Filed Mar. 29, 1967, Ser. No. 626,888
Int. Cl. A01d 7/00, 11/00; A01b 21/02
U.S. Cl. 172—350    7 Claims

ABSTRACT OF THE DISCLOSURE

A compact device, which when in a first position, may be rolled across the terrain of either private or public grounds in either a straight or curved path to retrieve leaves, small pieces of paper, and the like and deposit the same in a hopper, and when the device is placed in a second position it may be rolled over a hard surface without damage to rotatable toothed rings forming a part thereof.

BACKGROUND OF THE INVENTION

Field of the invention

A refuse retrieving device that not only performs the functions described, but may be used to perforate the ground with closely spaced openings to provide aeration of the soil and permit maximum absorption of water. The device performs these operations when moved in either a straight or curved path without tearing or damaging the turf over which it moves. By means of rollers and a linkage assembly forming a part thereof, the invention may be moved from a first to a second position wherein the toothed retrieving portions thereof are not damaged when the device is rolled over a hard surface.

Description of the prior art

Manually operable refuse retrieving devices have been devised and used to a limited extent in the past, but some of the disadvantages of such prior equipment have been found that they tear the turf over which they travel when directed in a sharply curved path, and must be manually carried across hard surfaces such as sidewalks, driveways, or the like, to prevent damage to the retrieving teeth thereof.

The present invention eliminates the operational disadvantages of equipment of this type available heretofore, yet retrieves refuse as described with a minimum of physical effort.

SUMMARY OF THE INVENTION

A refuse retrieving device provided with a plurality of longitudinally aligned and spaced toothed rings which are independently rotatable to permit guidance of the device through sharp curves without tearing or otherwise damaging turf over which it travels. The device is also characterized by the shape of the teeth, which is such that openings are made thereby in the ground over which the retrieving device travels without tearing any grass over which it travels to increase water absorption and avoid a substantial runoff therefrom. In addition, rollers ad linkage means are associated with the invention in such a manner that it may be selectively placed in a second position where it can move over a hard surface area without damage to the retrieving teeth thereof.

A major object of the invention is to provide a refuse retrieving device that is capable of performing the functions described above, which is compact, of simple mechanical structure, easily operated, requires little maintenance attention, and can be fabricated from standard, commercially available materials.

BRIEF DESCRIPTION OF THE DRAWING

FIGURE 1 is a perspective view of the refuse retrieving device;

FIGURE 2 is a transverse cross-sectional view of the device, taken on the line 2—2 of FIGURE 1;

FIGURE 3 is a vertical cross-sectional view of the retrieving device, taken on the line 3—3 of FIGURE 2;

FIGURE 4 is an enlarged cross-sectional view of that portion of the device circled in phantom line in FIGURE 3 and identified by the numeral 4; and FIGURE 5 is a transverse cross-sectional view of a portion of the handle of the device, taken on the line 5—5 of FIGURE 1.

DESCRIPTION OF THE PREFERRED EMBODIMENT

The detailed structure of the refuse retrieving device L is shown in the accompanying drawing, which includes a refuse-receiving hopper A that is removably supported on a frame B. Frame B also rotatably supports a number of longitudinally aligned and spaced circular toothed discs C, which when the device is in a first position, are in contact with the ground surface. As the device is rolled across a refuse littered ground surface, the discs C not only retrieve leaves and other litter, but perforate the ground without damage to vegetation growing thereon to facilitate absorption of moisture into the ground. A linkage assembly D and rollers E are so associated with the elements listed above (FIGURE 1) that the device may be selectively disposed in a second position where the toothed discs C are in an elevated position. When the retrieving device is in this second position it may be rolled across a hard surface such as a sidewalk, driveway, pavement, or the like, without damage to the toothed discs C. The device is moved and guided by a handle assembly F that projects upwardly and rearwardly from frame B, also shown in FIGURE 1.

In detail, the frame B is defined by an elongate rigid cross piece 10 from each end of which two arms 12 extend forwardly, as best seen in FIGURE 1. Each of the arms 12 is of V-shaped configuration and includes first and second portions 12a and 12b, with the first portion 12a being affixed to the cross piece 10. The second portions 12b project forwardly from first portion 12a, and a downwardly extending recess 14 is formed in the upper forward ends thereof, the purpose of which will later be explained. Recesses 14 and second arm portions 12b are in transverse alignment.

Transversely aligned bores 16 are formed in the first arm portions 12a. The refuse retrieving assembly C includes a shaft 18, the end portions 20 of which are reduced in transverse cross section and project through the bores 16. The portions 20 are threaded and are engaged by nuts 22, as illustrated in FIGURE 3. A number of cylindrical hubs 24 are rotatably supported on shafts 18 (FIGURE 3), and a ring-shaped flange 26 projects outwardly from the center portion of each hub. Each flange 26 is provided with two apertured circular plates 28 which abut against the sides thereof and are secured thereto by conventional means such as welding, or the like.

The outer circumferential ends of each pair of plates 28 (FIGURES 3 and 4) forming a part of the disc assembly C abut against opposite sides of a ring 30 of greater diameter than that of the plates, and a number of circumferentially spaced teeth 32 project from the peripheral edge of each ring. The teeth 32 are of curved or generally arcuate configuration, for reasons to be explained hereinafter.

The hubs 24 are preferably separated by ring-shaped spacers 34 mounted on the shaft 18, as best seen in FIGURE 3. Each ring 30 is secured to one of the pair of plates 28 by circumferentially spaced rivets 36, or other conventional fastening means. Rivets 36 project through transversely aligned bores 38 formed in the rings 30 and plates 28, as shown in FIGURE 4.

A bar 40 (FIGURES 1 and 2) that is parallel to cross piece 10 extends between the second arm portions 12b and is secured thereto by conventional means. As illustrated in FIGURE 2, the bar 40 is disposed forwardly of the teeth 32, and a number of curved rakes 42 extend upwardly and rearwardly therefrom. Rakes 42 are so spaced on the bar 40 that they are positioned in spaces (FIGURE 3) defined between the rings 30, as shown in FIGURES 2 and 3. Each of the rakes 42 is provided with an upper curved edge 42a that slopes downwardly and forwardly towards hopper A. Leaves and refuse deposited on edges 42a (FIGURES 1 and 2) will slide downwardly due to force of gravity into hopper A.

The elongate hopper A, as may be seen in FIGURES 1 and 2, is comprised of a flat bottom 46, two end pieces 48, a forwardly disposed side piece 50, and a rearwardly positioned side piece 52 of convex-concave configuration situated forwardly of the teeth 32. A portion of the upper edge of the side piece 52 is disposed adjacent to the forward extremities of the rakes 42, as shown in FIGURE 2.

First and second spaced pins 54 and 56 respectively, extend outwardly from each end piece 48. Pins 54 are in transverse alignment and adapted to be removably disposed in the openings 14 (FIGURE 1) to removably support the hopper A from the arms 12. Pins 56 are also in transverse alignment and abut against the lower edges of the second arm portions 12b when the pins 54 are disposed in recesses 14. The pins 54 and 56 are so positioned on hopper A, that the weight of the hopper tends to pivot it in a clockwise direction on the pins 54, but is prevented from so doing by the second pins 56, which are in abutting contact with the lower edges of the second arm portions 12b.

The hopper A is easily removed from arm portions 12b by moving the hopper A in a counter clockwise direction to the extent that it is possible to remove pins 54 from the openings 14 whereby the hopper may then be slid out of supporting engagement with the arm portions 12b.

The handle assembly F includes a transversely positioned handle 60 mounted on an elongate support 58, which extends forwardly and downwardly therefrom. The forward lower extremity of support 58 is affixed to cross piece 10. The elements comprising the linkage assembly D (FIGURE 1) include a lever 62 that is pivotally supported by a third pin 64, or other suitable means, from the upper portion of the support 58. By means of a fourth pin 66, lever 62 is pivotally connected to an elongate rigid link 68, and the forward end of this link is pivotally connected by a fifth pin 70 to a lug 72 affixed to a transversely positioned rod 75.

The ends of rod 75 are connected to two laterally spaced, parallel second links 74 which are pivotally supported on their rear end portions from the arms 12 by fourth pins 76. Two third links 78 extend downwardly and forwardly from the rod 75, and these links are connected by sixth pins 81 to two laterally spaced parallel legs 82 which are structurally identical and supported on the outer portions 20 of the shaft 18, as best seen in FIGURE 3.

The rear end of each of the legs 82 is provided with a stub shaft 84 on which one of the rollers E is mounted. Each of the rollers E (FIGURE 1) is of substantially smaller diameter than that of the rings 30. A spring clip 86 is mounted on the upper rear portion of support 58, as shown in FIGURES 1 and 5, and serves to removably engage the lever 62 when the lever is moved rearwardly to a position substantially parallel to support 58. When the lever 52 is in the latter position, the second arms 82 have been pivoted to positions where they are substantially vertical and rollers E support the retrieving device L above the ground surface. In this second position, the device may be moved across any hard surface without damage to the teeth 32.

In actual use the operation of the invention is most simple. The hopper A is supported on the device in the manner shown in FIGURE 1, and the lever 62 moved to the position shown in the same figure. The weight of the device L is sufficient to cause a portion of the teeth 32 to penetrate the ground G, as illustrated in FIGURE 2. As the device L is moved forwardly, the teeth 32 sequentially form openings 87 (FIGURE 2) in the ground G and concurrently impale leaves or bits of paper 88 on the teeth to be carried thereby until the loaded teeth reach the rakes 42 to displace any refuse therefrom and it slides by force of gravity into hopper A.

It should be particularly noted that the upper edges 42a of the rakes 42 curve forwardly and downwardly to permit the leaves to so drop into the hopper A. The teeth 32 are of a slightly arcuate arcuate shape, as shown in FIGURE 2, to permit the openings 87 to be formed whereby they do not tear out and carry grass or turf (not shown) therewith from the surface which the device L travels. Also due to this shape of the teeth 32, the leaves 88 are easily displaced therefrom by the rakes 42, for they move in a clockwise direction, as seen in FIGURE 2. The first and second pins 54 and 56 are so positioned on the end pieces 48 of hopper A that due to the weight thereof, the hopper as well as the weight of the leaves 88 deposited therein, tends to pivot in a clockwise direction on the pins 54, but with such pivotal movement being restrained by the second pins 56 which are in contact with the lower edge of the arms 14 (FIGURE 1).

After the hopper A has been filled with leaves 88, the hopper is removed from the arms 12 as previously described, the refuse dumped therefrom, and the hopper replaced for further gather of refuse by use of the device L. When it is desired to move the device L across a sidewalk, or driveway (not shown), the lever 62 is pivoted rearwardly to engage the clip 86 (FIGURE 5) and pivot the legs 82 and rollers E to second positions where the teeth 32 are disposed above the ground surface G and will not be damaged. Due to the fact that the hubs 24 are independently rotatable on shaft 18, the device L can be moved in a sharply curved path without tearing the grass or turf over which it travels.

To prevent displacement of leaves 88 from the teeth 32 as the latter move towards the hopper A, as well as to prevent a user from inadvertently contacting the teeth, a guard L is provided. The guard L includes an arcuate shell 90 that extends longitudinally over the upper portions of the rings 30 as shown in FIGURE 1, and end pieces 92 which depend from the shell and are affixed by conventional means to the inner surfaces of arms 12.

I claim:
1. A refuse retrieving device that may be moved in a sharply curved path without tearing grass over which it travels including:
   (a) an elongated receiving hopper having two spaced end pieces;
   (b) a generally U-shaped frame comprising a cross piece and two laterally spaced arms projecting forwardly from said cross piece;
   (c) first means for removably supporting said hopper from said arms;
   (d) a transverse shaft that extends between said arms;
   (e) a plurality of independently rotatable hubs supported on said shaft, with circular flange projecting from the center portion of each hub;
   (f) a plurality of apertured circular plates, arranged in pairs, with each pair of said plates being affixed to opposite sides of one of said flanges;
   (g) a plurality of rings, each of which is disposed between the outer portions of a pair of said plates;
   (h) a plurality of circumferentially spaced teeth on the outer portions of said rings projecting outwardly beyond said plates;

(i) a transverse bar extending between said arms forwardly of said teeth;

(j) a plurality of curved rakes affixed to said bar and extending rearwardly therefrom, with said rakes being at least partially disposed in transverse spaces defined betwen said teeth;

(k) a handle assembly projecting upwardly and rearwardly from said cross piece, which assembly permits said device to be guided and moved forwardly across a littered terrain to impale refuse on said teeth, to be thereafter carried to said rakes, with said rakes displacing said refuse from said teeth and guiding said refuse forwardly into said hopper;

(l) two laterally spaced legs pivotally supported on end portions of said shaft;

(m) two rollers rotatably supported on first end portions of said legs; and (n) manually operable linkage means for pivoting said legs into positions below said teeth to permit said device to be moved across a hard supporting surface without damage to said teeth.

2. A device as defined in claim 1 wherein said first means includes:

(o) two sets of spaced first and second pins that project from said end pieces, said first pins being disposed in transversely aligned recesses formed in the upper forward portions of said arms, which second pins when said first pins are so disposed abut against lower edges of said arms.

3. A device as defined in claim 1, which further includes:

(o) a plurality of ring-shaped spacers mounted on said shaft and disposed between said hubs.

4. A device as defined in claim 1 wherein said teeth are of arcuate shape to aid in perforating the ground over which said device travels with a minimum of damage to grass thereon, and to facilitate the transfer of said impaled refuse from said teeth to said rakes.

5. A device as defined in claim 4 wherein the upper edges of said rakes curve forwardly and downwardly towards said hopper.

6. A device as defined in claim 1 wherein said handle assembly includes:

(o) an elongated member that extends upwardly and rearwardly from said cross piece; and (p) a transverse handle secured to the rear end of said elongate member.

7. A device as defined in claim 6 wherein said linkage means includes:

(q) an elongate handle pivotally supported from said elongate member;

(r) a first link pivotally connected to said handle and extending forwardly therefrom;

(s) a transverse rod;

(t) a lug rigidly affixed to said rod and pivotally connected to said first link;

(u) two laterally spaced second links pivotally supported from said arms and connected to opposite ends of said rods;

(v) two legs having first and second end portions pivotally supported on opposite ends of said shaft;

(w) two rollers rotatably supported from first end portions of said legs; and (x) two third links pivotally connected to said second links and second end portions of said legs.

References Cited

UNITED STATES PATENTS

| | | | |
|---|---|---|---|
| 879,759 | 2/1908 | French | 172—350 X |
| 2,881,846 | 4/1959 | Stromberg | 172—350 X |
| 3,193,021 | 7/1965 | Lane | 72—556 X |

ABRAHAM G. STONE, *Primary Examiner.*

STEPHEN C. PELLEGRINO, *Assistant Examiner.*

U.S. Cl. X.R.

56—327; 171—53; 172—556